(12) United States Patent
Öhrström

(10) Patent No.: US 9,411,566 B2
(45) Date of Patent: Aug. 9, 2016

(54) SYSTEM AND METHOD FOR REMOVAL OF ARRAYCOPIES IN JAVA BY CUTTING THE LENGTH OF ARRAYS

(75) Inventor: Fredrik Öhrström, Stockholm (SE)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 457 days.

(21) Appl. No.: 12/963,434

(22) Filed: Dec. 8, 2010

(65) Prior Publication Data

US 2012/0151458 A1  Jun. 14, 2012

(51) Int. Cl.
G06F 9/45 (2006.01)

(52) U.S. Cl.
CPC ..................... *G06F 8/443* (2013.01)

(58) Field of Classification Search
CPC .......... G06F 9/50; G06F 9/445; G06F 9/466; G06F 9/45504; G06F 8/443; G06F 3/00; G06F 5/00; G06F 7/00; G06F 12/00; G06F 13/00; G06F 8/4441
USPC ................. 717/106, 122, 136, 148, 151, 152; 707/102; 709/219; 713/193; 711/6, 711/154, 170
See application file for complete search history.

(56) References Cited

U.S. PATENT DOCUMENTS

| | | | |
|---|---|---|---|
| 4,012,725 A * | 3/1977 | Spangler et al. | 708/130 |
| 4,180,854 A * | 12/1979 | Walden et al. | 708/130 |
| 5,790,867 A | 8/1998 | Schmidt | |
| 6,505,344 B1 | 1/2003 | Blais | |
| 6,675,378 B1 | 1/2004 | Schmidt | |
| 6,684,393 B1 | 1/2004 | Loen | |
| 6,760,905 B1 | 7/2004 | Hostetter | |
| 7,076,773 B2 | 7/2006 | Schmidt | |
| 7,168,071 B2 | 1/2007 | Wu | |
| 7,257,685 B2 | 8/2007 | Tene | |
| 2002/0166116 A1* | 11/2002 | Eidt | 717/152 |
| 2004/0267804 A1* | 12/2004 | Fresko et al. | 707/102 |
| 2006/0136875 A1* | 6/2006 | Thorpe | 717/122 |
| 2007/0074228 A1 | 3/2007 | Suzumura | |
| 2007/0100967 A1* | 5/2007 | Smith et al. | 709/219 |
| 2007/0150509 A1 | 6/2007 | Lev | |
| 2008/0091697 A1 | 4/2008 | Cui | |
| 2008/0148246 A1* | 6/2008 | Lagergren | 717/148 |
| 2014/0201742 A1 | 7/2014 | Lagergren | |

OTHER PUBLICATIONS

Sam Allen, "Array.copy Method Usage in C#", dotnetperls.com, Jun. 2009, p. 1-4 <dotnetperls_61309.pdf>.*

(Continued)

*Primary Examiner* — Tuan Vu

(74) *Attorney, Agent, or Firm* — Tucker Ellis LLP

(57) ABSTRACT

A system and method for removal of array copies in Java by reusing a source array for the target array and potentially cutting the length of the source array. In accordance with an embodiment, the system comprises physical computers or similar computing devices; a computing or virtual execution environment; a virtual machine that includes a compiler and memory spaces for Java application bytecode and storage for generated machine code; and wherein the compiler performs a static analysis of the code wherever any array copy is found, and determines if the array copy can be replaced with a reuse of the source array as the target array, potentially followed by a cut operation, and if so modifies the generated machine code accordingly.

20 Claims, 3 Drawing Sheets

(56) References Cited

OTHER PUBLICATIONS

Friesen, "Study Guide: Java's Character and Assorted String Classes Support Text Processing", JavaWorld.com, Oct. 4, 2002, 7 pages.

Choi, "Escape Analysis for Java", ACM, 1999, 19 pages.

Blanchet, "Escape Analysis for Object Oriented Languages. Application to Java™", ACM, 1999, 15 pages.

Troll Tech, "QT Shared Classes", published May 1, 2001 (Teaching shallow vs. deep copying of arrays and the benefit of a shallow array using less memory and CPU resources).

Office Action received from USPTO on U.S. Appl. No. 14/222,414, published as U.S. publication No. US 2014/0201742, now U.S. Pat. No. 9,183,013, mailed Nov. 7, 2014, 37 pages.

Javacard, javacard.framework Class Util, Sun Microsystems, Inc. (2005) retrieved from http://www.win.tue.nl/pinpasjc/docs/apis/jc222/javacard/framework/Util.html on Oct. 29, 2014, 3 pages.

Javacard, javacard.framework Class Util, Sun Microsystems, Inc. (2005) retrieved from http://www.win.tue.nl/pinpasjc/docs/apis/jc222/javacard/framework/Util.html on Apr. 7, 2016, 7 pages.

* cited by examiner

SYSTEM AND METHOD FOR REMOVAL OF ARRAYCOPIES IN JAVA BY CUTTING THE LENGTH OF ARRAYS

CROSS-REFERENCE TO RELATED APPLICATIONS

This application is related to U.S. patent application Ser. No. 11/954,103, titled "SYSTEM AND METHOD FOR REDUNDANT ARRAY COPY REMOVAL IN A POINTER-FREE LANGUAGE", filed Dec. 13, 2007; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to virtual machines, such as Java Virtual Machines (JVM), and is particularly related to a system and method for removal of array copies in Java by cutting the length of arrays.

BACKGROUND

A virtual machine (VM) can be considered an abstract computer that allows for portability of software applications between different underlying computer architectures, including different computer hardware platforms and/or operating systems. The VM provides a uniform layer of abstraction between the hardware platform and any compiled software applications that runs thereon. Virtual machines are considered essential for the portability of certain technologies, such as Java. The Java Virtual Machine (JVM) allows compiled Java programs to be run on the JVM, independently of whatever hardware or operating system may be used underneath. Examples of available JVMs include the Oracle JRockit and Hotspot JVMs.

Recently, there is a desire to deploy virtual machines on high performance computer hardware systems, such as multi-processor rack-based servers, to support highly efficient application server and similar technologies. Examples of application servers which can provide such technologies are the Oracle WebLogic Server. In some instances, a hypervisor acts as an additional layer between the server's hardware and its operating system. This provides an additional abstraction layer that allows each physical server to run one or more virtual servers, and effectively decouples the operating system and its applications from the underlying physical server. This is of particular use in a cloud-based environment.

One feature that is commonly used in a VM and in pointer free languages such as Java is the array copy operation, in which the size of an array can be increased or decreased by allocating a new larger or smaller array, and copying the contents into the new array. However, array copying is a time expensive operation on modern hardware with its memory bandwidth limitations. Although techniques have been devised to reduce such copying, these techniques are not as successful at addressing conversion, such as by Java Database Connectivity (JDBC) drivers, between bytes received over the network to Strings usable within Java, particularly in newer high performance computer hardware systems. These are the general areas that embodiments of the present invention are intended to address.

SUMMARY

Disclosed herein is a system and method for removal of array copies in Java by reusing a source array for the target array and potentially cutting the length of the source array. In accordance with an embodiment, the system comprises physical computers or similar computing devices; a computing or virtual execution environment; a virtual machine that includes a compiler and memory spaces for Java application bytecode and storage for generated machine code; and wherein the compiler performs a static analysis of the code wherever any array copy is found, and determines if the array copy can be replaced with a reuse of the source array as the target array, potentially followed by a cut operation, and if so modifies the generated machine code accordingly.

DETAILED DESCRIPTION

Figure 1:
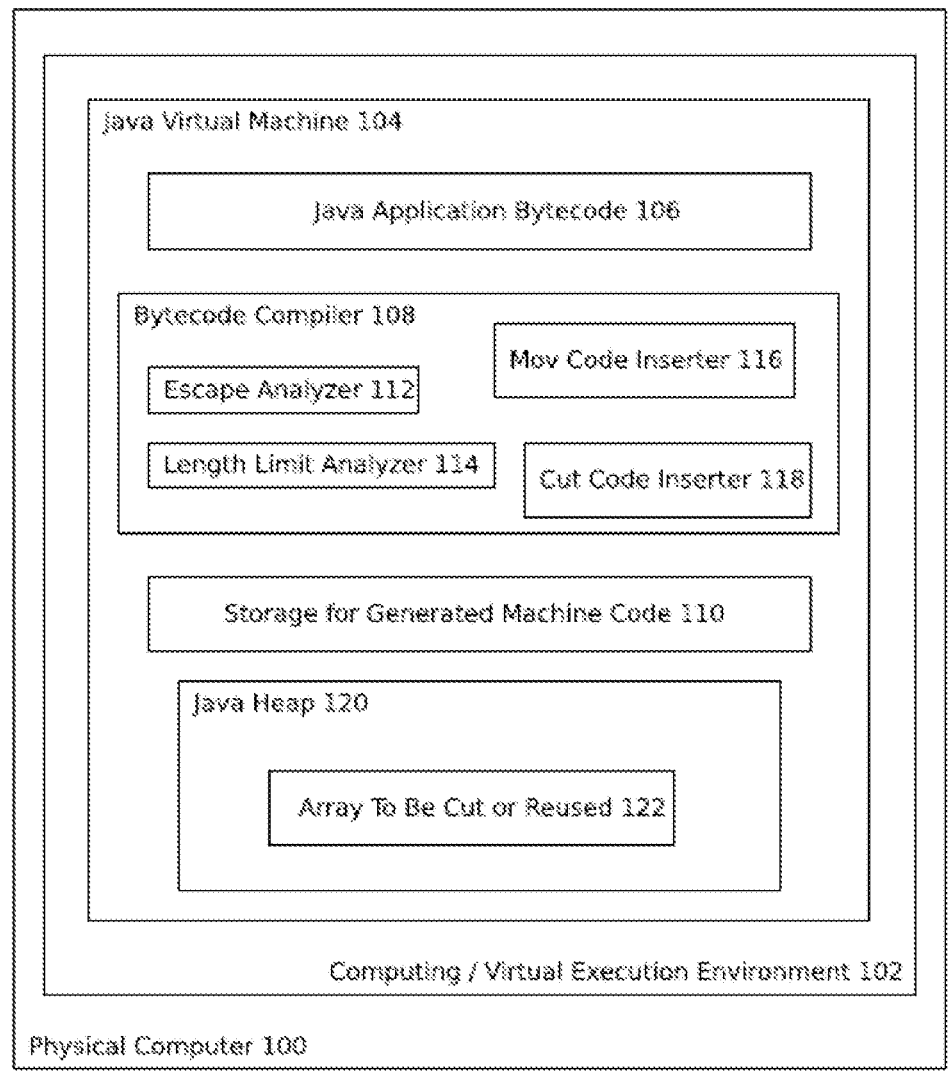
FIG. 1 shows an illustration of a system for removal of array copies in Java by reusing the source array as the target array and potentially cutting the length of the source array, in accordance with an embodiment.

As described above, one feature that is commonly used in a VM and in pointer free languages such as Java is the array copy operation, in which the size of an array can be increased or decreased by allocating a new larger or smaller array followed by copying the contents into the new array. However, array copying is a time expensive operation on modern hardware with its memory bandwidth limitations. Although techniques have been devised to reduce such copying, these techniques are not as successful at addressing conversion, such as by Java Database Connectivity (JDBC) drivers, between bytes received over the network to Strings usable within Java, particularly in newer high performance computer hardware systems.

More particularly, in many newer computing systems, such the Oracle Exalogic platform, that operate as part of a stack, such conversion within the JDBC drivers can be a major hotspot in the stack. These considerations are pertinent to other protocol parsers, in addition to the JDBC driver.

In one implementation, a large byte array named "raw" is filled with bytes received over the network from the database. As part of the decoding process, "raw" and an offset into "raw" is passed to a string extractor function. The string extractor function does not know exactly how long the extracted string will be, but it does know an upper bound for the string length. This knowledge comes for example, from the specification of the network protocol that is to be parsed. The string extractor function will allocate a char[ ] array named "cooked", with the maximum potential length of the extracted string. It will then proceed to parse the bytes from "raw" and store the decoded characters into "cooked". This parsing and decoding is often complex and time consuming and this is the reason why it would be less than optimal to calculate the exact length from the beginning. When "cooked" is done, the exact length is known, and it will most likely be less than the allocated length for "cooked". The excess memory allocated for cooked must now be released. Therefore the string extractor function allocates a new char[ ] array named "trimmed" with the same length as the extracted string, and uses System.arraycopy to copy the data from "cooked" into "trimmed". Finally, a Java String constructor is called with "trimmed" as the argument, and the newly constructed string is returned. In a straightforward implementation of a JVM this will result in two array copies, the first from "cooked" to "trimmed" and the second from "trimmed" to the internal String array.

Various implementations of the Java Virtual Machine (JVM), such as the JRockit JVM have provided optimizations tailored for removing System.arraycopy, such as the optimizations described in U.S. patent application Ser. No. 11/954,103, which is herein incorporated by reference. That particular application deals with the second array copy, i.e. copying of "trimmed" into the internal String array by detecting that "trimmed" does not escape and is the same size as the internal String array, thus replacing the array copy with a simple guarded assignment. Unfortunately, the optimizations described therein are not satisfactory to the problem at hand since they cannot remove the first array copy.

To address this, disclosed herein is a system and method for removal of array copies in Java by reusing the source array as the target array and potentially cutting the length of the source array. In accordance with an embodiment, the system comprises physical computers or similar computing devices; a computing or virtual execution environment; a virtual machine that includes a compiler and memory spaces for Java application bytecode and storage for generated machine code; and wherein the compiler performs a static analysis of the code wherever any array copy is found, and determines if the array copy can be replaced with a reuse of the source array as the target array, potentially followed by a cut operation, and if so modifies the generated machine code accordingly.

FIG. 1 shows an illustration of a system for removal of array copies in Java by reusing the source array as the target array and potentially cutting the length of the source array, in accordance with an embodiment. As shown in FIG. 1, the system comprises physical computing hardware 100. The physical hardware executes a computing/virtual execution environment 102, which can for example be a standard operating system, a standard operating system running inside a hypervisor, or an operating system tailored for the JVM as described, for example, in U.S. patent application Ser. No. 11/954,103, incorporated herein by reference.

As further shown in FIG. 1, in accordance with an embodiment, each computing environment a virtual machine (VM) or JVM 104, for example an Oracle JRockit, Hotspot or another JVM implementation, that allows compiled Java programs 106 to be run on the JVM independently of the hardware or operating system used underneath. The JVM includes a bytecode compiler 108, and a memory space 110 for storage of compiled bytecode.

As further shown in FIG. 1, in accordance with an embodiment, the Bytecode compiler 108 uses an escape analyzer 112, in combination with a length limit analyzer 114, to replace a System.arraycopy with a single mov instruction 116 or cut code 118 in the generated machine code. The generated machine code will operate on arrays located in the Java heap 120 such that a trimmed array 122 will be reused as is, if the lengths are equal, or cut if the trimmed size is shorter.

Figure 2:
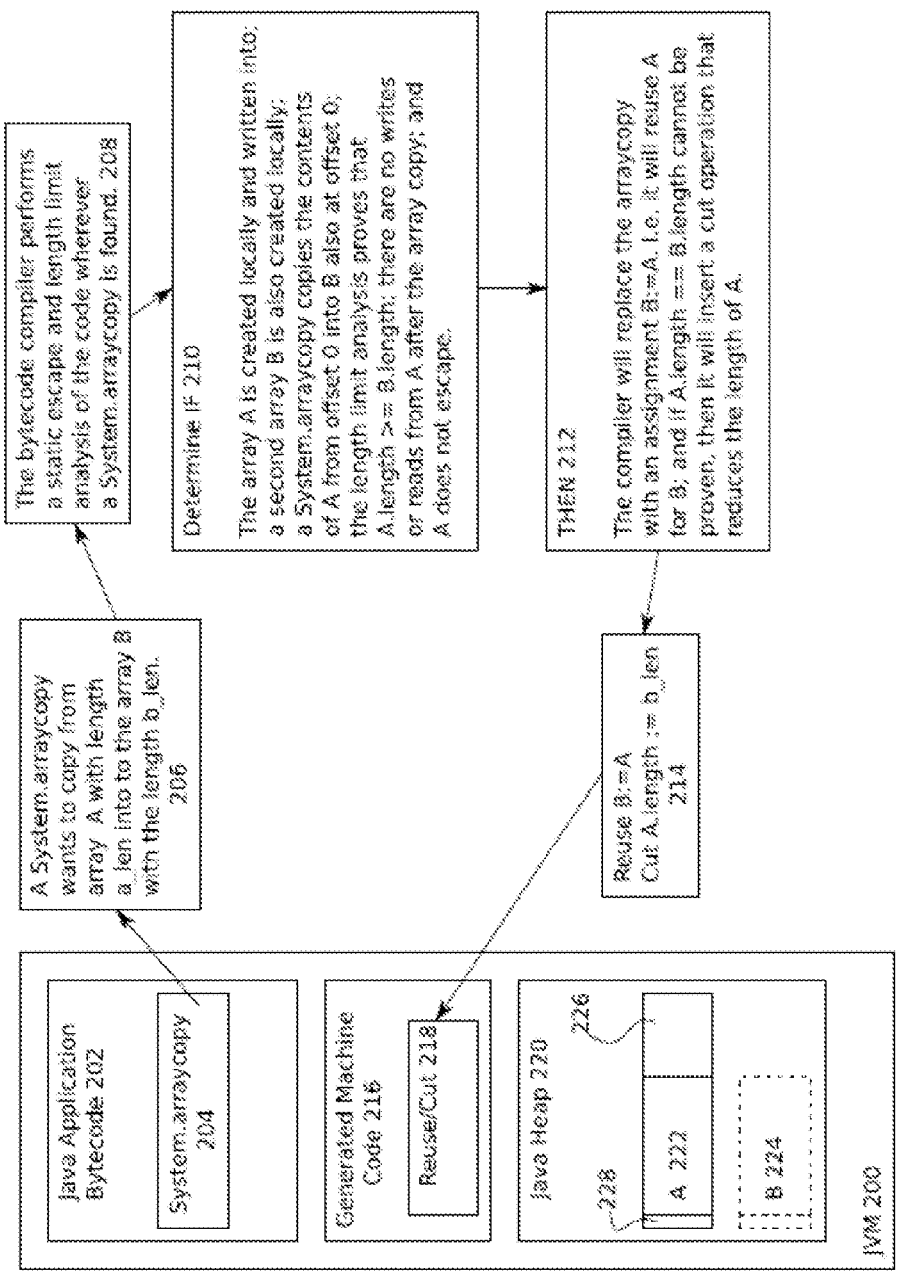
FIG. 2 shows a further illustration of a system for removal of array copies in Java by reusing the source array as the target array and potentially cutting the length of the source array, in accordance with an embodiment.

FIG. 2 shows a further illustration of a system for removal of array copies in Java by reusing the source array as the target array and potentially cutting the length of the source array, in accordance with an embodiment. In accordance with an embodiment, the JVM 200 will compile the Java Application Bytecode 202 and scan the bytecode for System.arraycopy calls 204. When a call is found 206, the compiler performs escape and length limit analysis 208 to the System.arraycopy callsite to determine if A escapes or not, and whether the offsets are 0 and the lengths can be proven to be A.length>=B.length. As referred to herein, escape analysis is a standard technique that can be used to determine if objects allocated within a certain scope (most often a method) are never used anywhere outside the scope. Length limit analysis is another standard technique to determine relationships between different numerical variables. (Commonly used to prove how many times a loop will execute.) If the compiler finds a particular pattern 210:

An array A is created locally and written into;
a second array B is also created locally;
a System.arraycopy copies the contents of A from offset 0 into B also at offset zero;
the length limit analysis proves that A.length>=B.length;
there are no writes or reads from A after the array copy; and
A does not escape.

then, in accordance with an embodiment, the compiler determines 210 that the found System.arraycopy can be replaced with code that reuses A for B and potentially cuts the length of A down to the desired length of B:

The compiler will replace the arraycopy
with an assignment B:=A. i.e. it will reuse A
for B; and
if A.length==B.length cannot be proven, then it will
insert a cut operation that reduces the
length of A.

Using the above technique, a System.arraycopy 206 is reduced 214 to an assignment, and potentially a cut operation that cuts the length of A down to B. Such a cut is not possible to perform from Java code, or even from the bytecode. When the assignment and the potential cut is inserted into generated machine code 216, the final machine code 218 might be optimized to a single cut operation since assignments are dealt with in the register allocator. If there is no cut operation since the length limit analysis proved that A.length==B.length then the final code will optimized to nothing.

The implementation of the cut operation depends on the particular JVM. In the JRockit JVM, empty space in the Java Heap 220 need not be marked in any particular way. When in JRockit the optimization has detected that the array A 222 can be reused for B 224, thus B will never be allocated. The unused space of A, 226 that is to be returned to the Java heap is freed by writing the new length of A into the length field of A 228. Thus in JRockit the cut operation is a single machine code instruction "mov b_len into A.length". The freed space 226 will be reclaimed at the next garbage collect.

In the Hotspot JVM, the freed space 226 must be initialized to look like a special filler object. This will require one or two more writes to the beginning of the space 226 to make 226 look like an object. This is necessary since the Hotspot JVM expects to Java heap to be filled with valid objects so that it can iterate over the whole heap. Thus in Hotspot the cut operation is three machine code instructions "mov b_len into A.length", "mov filler_object_header into first object boundary inside area 226" and "mov filler_object_size into the filler_object now inside area 226".

Figure 3:
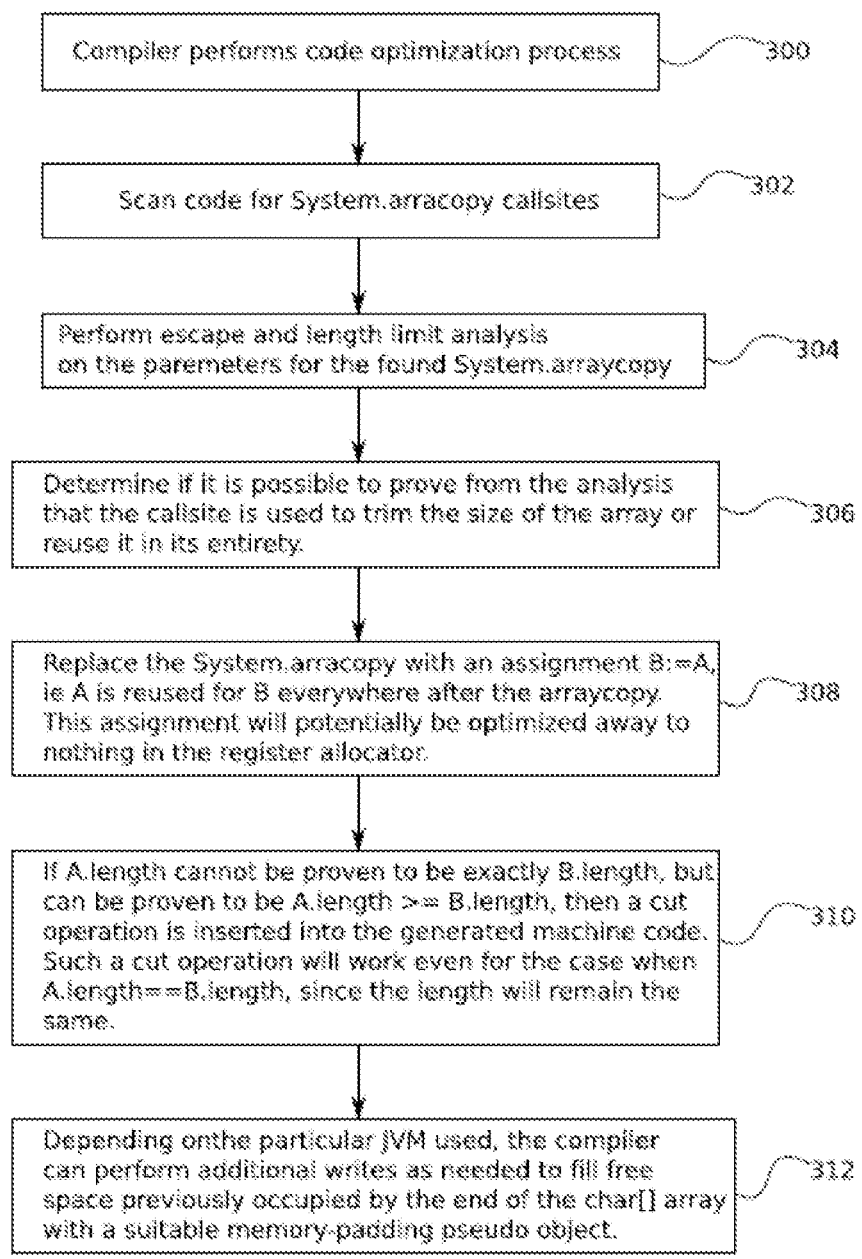
FIG. 3 shows a flowchart of a method for removal of array copies in Java by reusing the source array as the target array and potentially cutting the length of the source array, in accordance with an embodiment.

FIG. 3 shows a flowchart of a method for removal of array copies in Java by reusing the source array as the target array and potentially cutting the length of the source array, in accordance with an embodiment. As shown in FIG. 3, in step 300, the compiler performs a code optimization process. In step 302, the compiler scans the bytecode to be compiled for System.arraycopy callsites. In step 304, the compiler performs escape and length limit analysis of the parameters passed to the System.arraycopy call. In step 306, the compiler determines based on the escape and length limit analysis, if it is possible to trim the size of the array instead of copying it, or even reuse the array in its entirety. If this is the case, the compiler will, in step 308, replace the System.arraycopy with an assignment B:=A, i.e. A is reused for B everywhere after the arraycopy. Such an assignment when expressed in the intermediate representation of the code that is being compiled is an abstract assignment—it might or might not be translated into an actual machine code move. This depends on how the register allocator uses registers to store the abstract variables A and B. Thus there is a good chance that the assignment will optimize into nothing. Since A is reused for B, there is no need to allocate B at all and this reduces the memory allocation rate in the compiled code. In step 310, if the compiler cannot prove that A.length==B.length but can prove that A.length>=B.length (this was done in step 306), then the compiler has to insert a cut operation to trim the length of A. Such a cut operation consists of a write into the length field of the array A. This will work situations when A.length==B.length since the write will leave A in the same state as before. In step 312, depending on the particular JVM used, the compiler can perform additional writes as needed to fill free space previously occupied by the end of the char[ ] array with a suitable memory-padding pseudo object.

In accordance with an embodiment, the result of using the above technique is that if, e.g. a 1024 byte array A is always allocated, and the average size of the array B is 512 bytes, the memory saving by not allocating the B array is therefore on average 33%. The cost of actually copying the array is completely removed. In some newer computing systems, such the Oracle Exalogic platform, there are several areas within the stack where this happens. In these environments, the array sizes can be larger, up to multiple megabytes, so the performance gains can be significant, particularly in providing a reduction in the allocation rate, and reducing CPU-burn.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for compiling bytecode, comprising:
   a computing environment which includes one or more physical computing devices having one or more processors;
   a virtual machine that includes a compiler and a memory heap for storage of a compiled bytecode; and
   wherein the compiler, during compilation of the bytecode,
      scans the bytecode for array copy calls,
      locates, in the bytecode, an array copy call which indicates a source array, and a target array,
      determines a source array length and a target array length, and that the source array length is one of greater than or equal to the target array length, and
      analyzes the array copy call to determine that the source array does not escape; and
   wherein in response to determining that the source array does not escape, and that the source array length is one of greater than or equal to the target array length, the compiler
      generates machine code which reuses the source array for the target array, by replacing the array copy call with an assignment of the source array as the target array, and
      when the source array length is determined to be greater than the target array length, inserts, during the compilation of the bytecode, a cut operation into the generated machine code that writes a value indicative of the source array length to equal that of the target array length, to reduce the length of the source array within the heap.

2. The system of claim 1, wherein the assignment is made by the compiler within an intermediate representation of the bytecode to be compiled.

3. The system of claim 1, wherein the generated machine code performs additional writes as needed to fill free space previously occupied by the end of the source array with a suitable memory-padding pseudo object.

4. The system of claim 1, wherein the virtual machine is a Java Virtual Machine (JVM) and the array copy call is a System.arraycopy call.

5. The system of claim 1, further comprising when the array copy call is located, determining that the array copy call copies the contents of the source array from a particular offset value, to the target array at the same offset value.

6. The system of claim 1, wherein, during the determining that the source array does not escape, and that the source array length is one of greater than or equal to the target array length, if the compiler further determines that the source array length is equal to the target array length, the compiler optimizes the generated machine code to remove the array copy.

7. A method for compiling bytecode, the method comprising:
   providing a virtual machine that includes a compiler and a memory heap for storage of compiled bytecode;

scanning the bytecode for array copy calls using the compiler;

locating an array copy call with the compiler, wherein the array copy call indicates a source array, and a target array;

determining a source array length and a target array length, and that the source array length is one of greater than or equal to the target array length;

analyzing the array copy call with the compiler to determine that the source array does not escape; and in response to determining that the source array does not escape, and that the source array length is one of greater than or equal to the target array length, generating machine code with the compiler, which reuses the source array for the target array by replacing the array copy call with an assignment of the source array as the target array, and when the source array length is determined to be greater than the target array length, inserting, during the compilation of the bytecode, a cut operation into the generated machine code that writes a value indicative of the source array length to equal that of the target array length, to reduce the length of the source array within the heap.

8. The method of claim 7, wherein the assignment is made by the compiler within an intermediate representation of the bytecode to be compiled.

9. The method of claim 7, wherein: the generated machine code performs additional writes as needed to fill free space previously occupied by the end of the source array with a suitable memory-padding pseudo object.

10. The method of claim 7, wherein the virtual machine is a Java Virtual Machine (JVM) and the array copy call is a System.arraycopy call.

11. The method of claim 7, further comprising when the array copy call is located, determining that the array copy call copies the contents of the source array from a particular offset value, to the target array at the same offset value.

12. The method of claim 7, wherein, during the determining that the source array does not escape, and that the source array length is one of greater than or equal to the target array length, if the compiler further determines that the source array length is equal to the target array length, the compiler optimizes the generated machine code to remove the array copy.

13. A non-transitory computer readable medium including instructions stored thereon for compiling bytecode, which instructions, when read and executed by a computer cause the computer to perform steps comprising:

providing a virtual machine that includes a compiler and a memory heap for storage of compiled bytecode;

scanning the bytecode for array copy calls using the compiler;

locating an array copy call with the compiler, wherein the array copy call indicates a source array, and a target array;

determining a source array length and a target array length, and that the source array length is one of greater than or equal to the target array length;

analyzing the array copy call with the compiler to determine that the source array does not escape; and in response to determining that the source array does not escape, and that the source array length is one of greater than or equal to the target array length, generating machine code with the compiler, which reuses the source array for the target array by replacing the array copy call with an assignment of the source array as the target array, and when the source array length is determined to be greater than the target array length, inserting, during the compilation of the bytecode, a cut operation into the generated machine code that writes a value indicative of the source array length to equal that of the target array length, to reduce the length of the source array within the heap.

14. The non-transitory computer readable medium of claim 13, wherein the assignment is made by the compiler within an intermediate representation of the bytecode to be compiled.

15. The non-transitory computer readable medium of claim 13, wherein, depending on the particular virtual machine used, the generated machine code performs additional writes as needed to fill free space previously occupied by the end of the source array with a suitable memory-padding pseudo object.

16. The non-transitory computer readable medium of claim 13, wherein the virtual machine is a Java Virtual Machine (JVM) and the array copy call is a System.arraycopy call.

17. The non-transitory computer readable medium of claim 13, further comprising when the array copy call is located, determining that the array copy call copies the contents of the source array from a particular offset value, to the target array at the same offset value.

18. The non-transitory computer readable medium of claim 13, wherein, during the determining that the source array does not escape, and that the source array length is one of greater than or equal to the target array length, if the compiler further determines that the source array length is equal to the target array length, the compiler optimizes the generated machine code to remove the array copy.

19. A method for compiling bytecode, the method comprising:

providing a virtual machine that includes a compiler and a memory heap for storage of compiled bytecode;

scanning the bytecode for array copy calls using the compiler;

locating an array copy call with the compiler, wherein the array copy call indicates a source array created locally, and a target array created locally;

determining a source array length and a target array length, and that the source array length is one of greater than or equal to the target array length;

analyzing the array copy call with the compiler to determine that the source array does not escape; and in response to determining that the source array does not escape, and that the source array length is one of greater than or equal to the target array length, generating an intermediate representation of a machine code with the compiler, which reuses the source array for the target array by replacing the array copy call with an assignment of the source array as the target array, and when the source array length is determined to be greater than the target array length, inserting, during the compilation of the bytecode, a cut operation into the generated intermediate representation of the machine code that writes a value into a length field of the source array equal to that of the target array length, to reduce the length of the source array within the heap, prior to generating a final machine code.

20. The method of claim 19, further comprising at least one of making unused space previously occupied by the source array available for garbage collection; or performing additional writes to fill free space occupied by the source array prior to the cut operation.

\* \* \* \* \*